(12) United States Patent
Inoue et al.

(10) Patent No.: US 7,336,067 B2
(45) Date of Patent: Feb. 26, 2008

(54) SENSOR ASSEMBLY, SEALING DEVICE, AND ROLLER BEARING APPARATUS FOR VEHICLES HAVING INTEGRATED CONNECTOR AND RING

(75) Inventors: Masahiro Inoue, Osaka (JP); Shunichi Matsui, Osaka (JP); Yoshifumi Shige, Osaka (JP); Minoru Sentoku, Osaka (JP); Katsura Koyagi, Osaka (JP)

(73) Assignee: JTEKT Corporation, Osaka (JP)

( * ) Notice: Subject to any disclaimer, the term of this patent is extended or adjusted under 35 U.S.C. 154(b) by 74 days.

(21) Appl. No.: 10/544,802

(22) PCT Filed: Feb. 3, 2004

(86) PCT No.: PCT/JP2004/001029

§ 371 (c)(1),
(2), (4) Date: Aug. 3, 2005

(87) PCT Pub. No.: WO2004/070221

PCT Pub. Date: Aug. 19, 2004

(65) Prior Publication Data

US 2006/0228060 A1     Oct. 12, 2006

(30) Foreign Application Priority Data

Feb. 3, 2003 (JP) ............................. 2003-025543
Feb. 3, 2003 (JP) ............................. 2003-025544
Feb. 3, 2003 (JP) ............................. 2003-025545

(51) Int. Cl.
*G01P 3/44* (2006.01)
*G01P 3/488* (2006.01)

(52) U.S. Cl. ....................... 324/174; 384/448

(58) Field of Classification Search ................ 324/207, 324/207.12–207.25, 173, 174; 384/448
See application file for complete search history.

(56) References Cited

U.S. PATENT DOCUMENTS 5,079,511 A * 1/1992 Donat ..................... 327/58
5,382,098 A    1/1995 Rigaux et al.
6,499,885 B2  12/2002 Toda et al.

FOREIGN PATENT DOCUMENTS

| JP | 6-49826 | 7/1994 |
|---|---|---|
| JP | 8-43411 | 2/1996 |
| JP | 10-19912 | 1/1998 |
| JP | 11-23600 | 1/1999 |
| JP | 11-118817 | 4/1999 |
| JP | 2001-500597 | 1/2001 |
| JP | 2002-54647 | 2/2002 |
| JP | 2002-206557 | 7/2002 |
| JP | 2002-327847 | 11/2002 |
| WO | WO-00/75673 | 12/2000 |

* cited by examiner

*Primary Examiner*—Jay M Patidar
(74) *Attorney, Agent, or Firm*—Jordan and Hamburg LLP

(57) ABSTRACT

Balls are interposed between respective raceway surfaces of inner and outer ring members, and a seal apparatus is provided between shoulder portions of the inner and outer ring members. The seal apparatus comprises an outer ring-side seal ring fixed to the outer ring member, and an inner ring-side seal ring fixed to the inner ring member. A pulser ring is fixed to a ring-shaped core metal of the inner ring-side seal ring. In an outer diameter side of the ring-shaped core metal of the outer ring-side seal ring, a magnetic sensor is molded with resin by an external member to be integrated therein. A connector connected to the magnetic sensor is formed consecutive with the external member.

12 Claims, 14 Drawing Sheets

F I G. 3
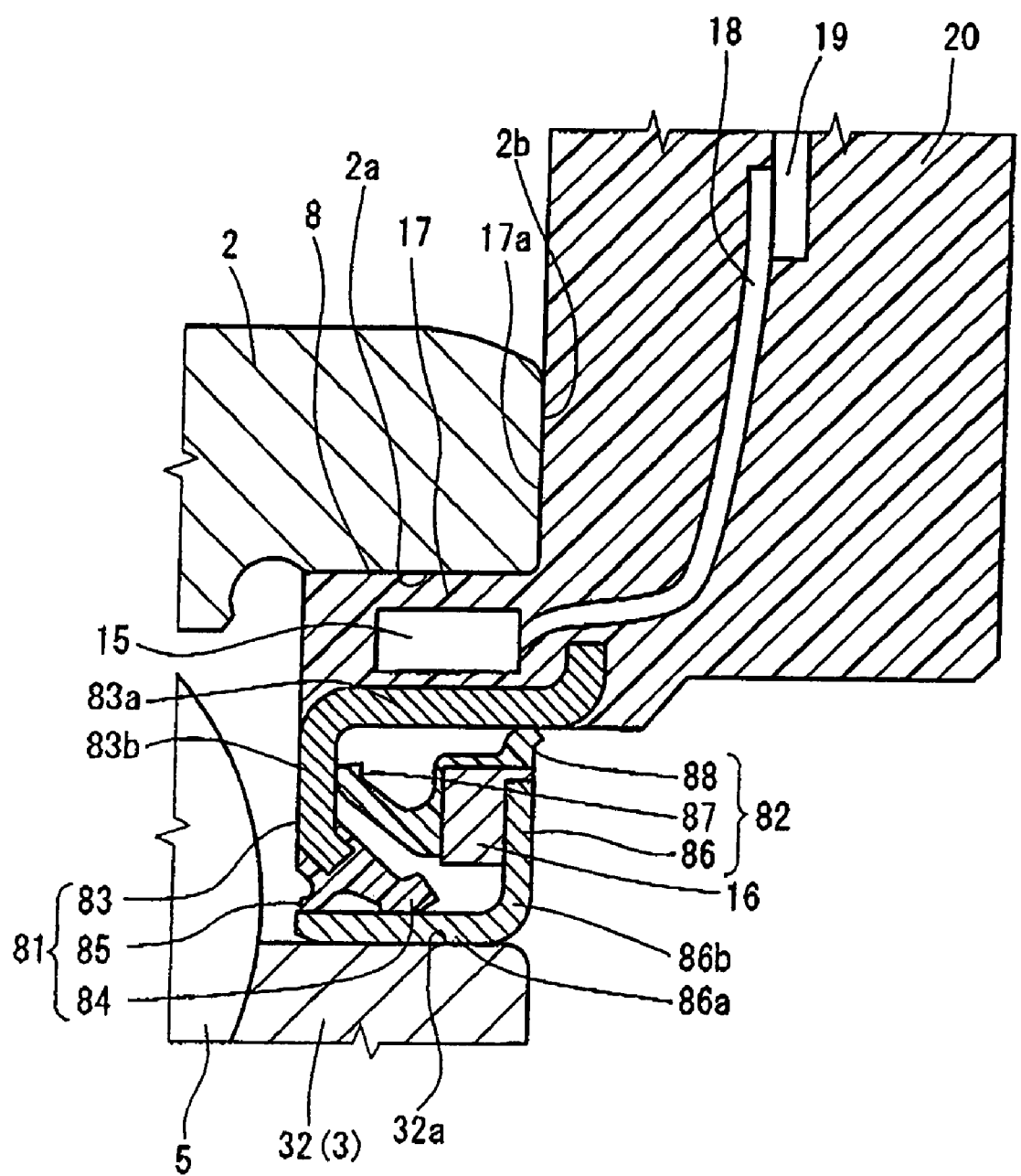

FIG. 5
(A) 
(B) 
FIG. 6
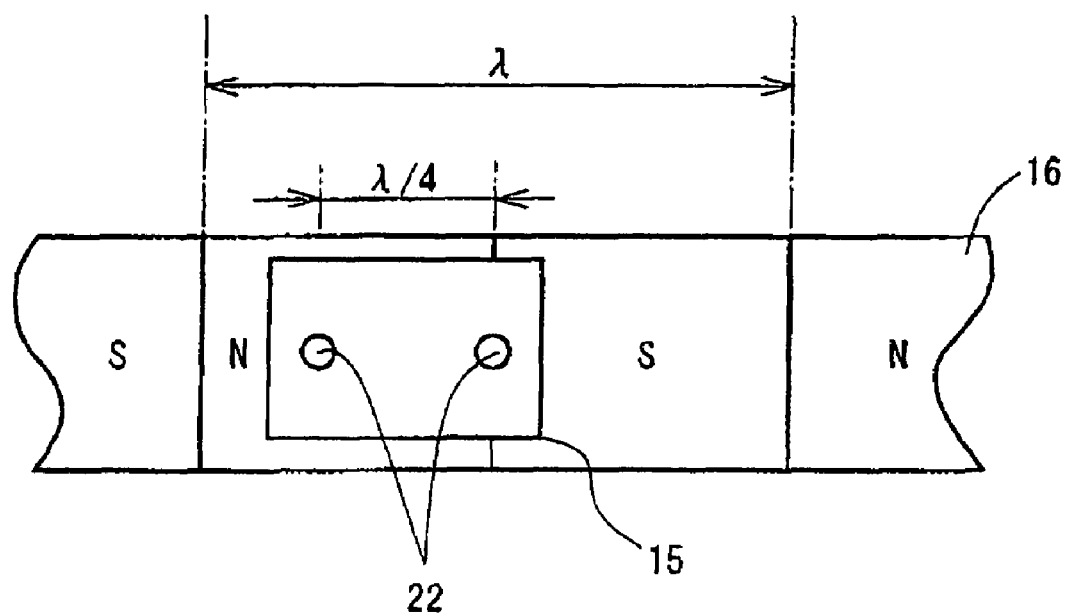

F I G. 1 0
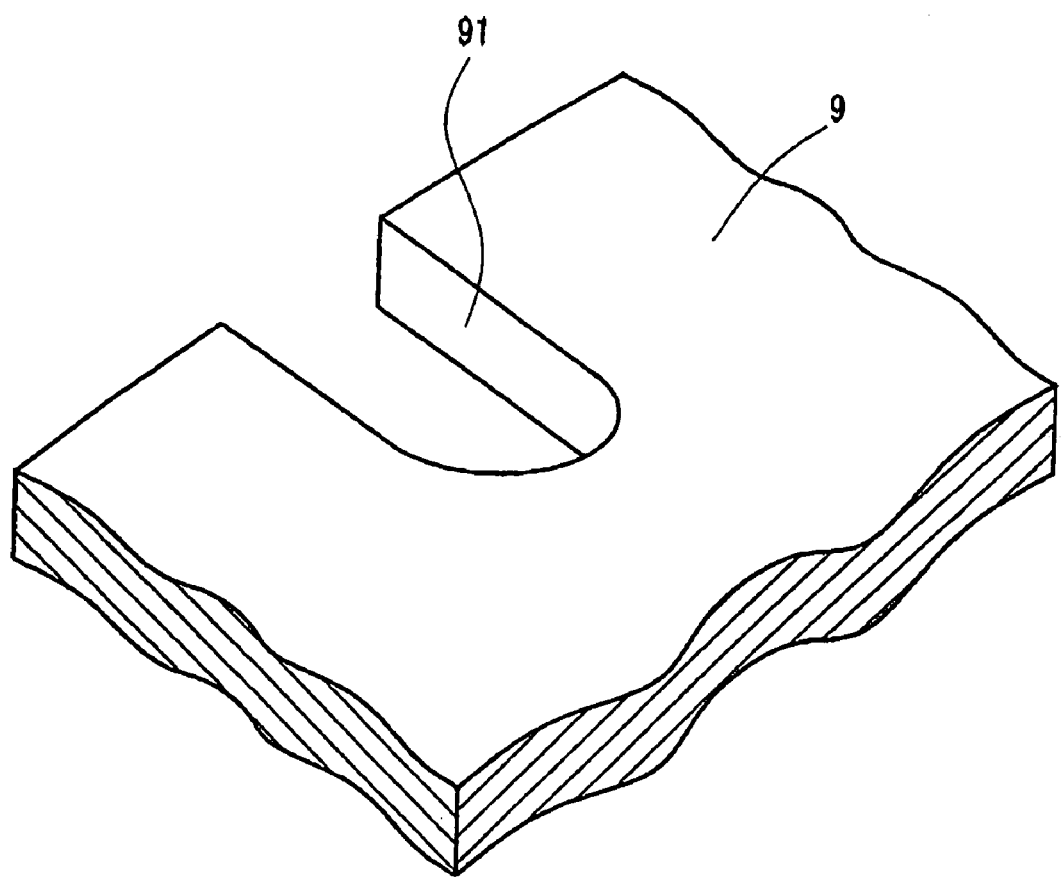
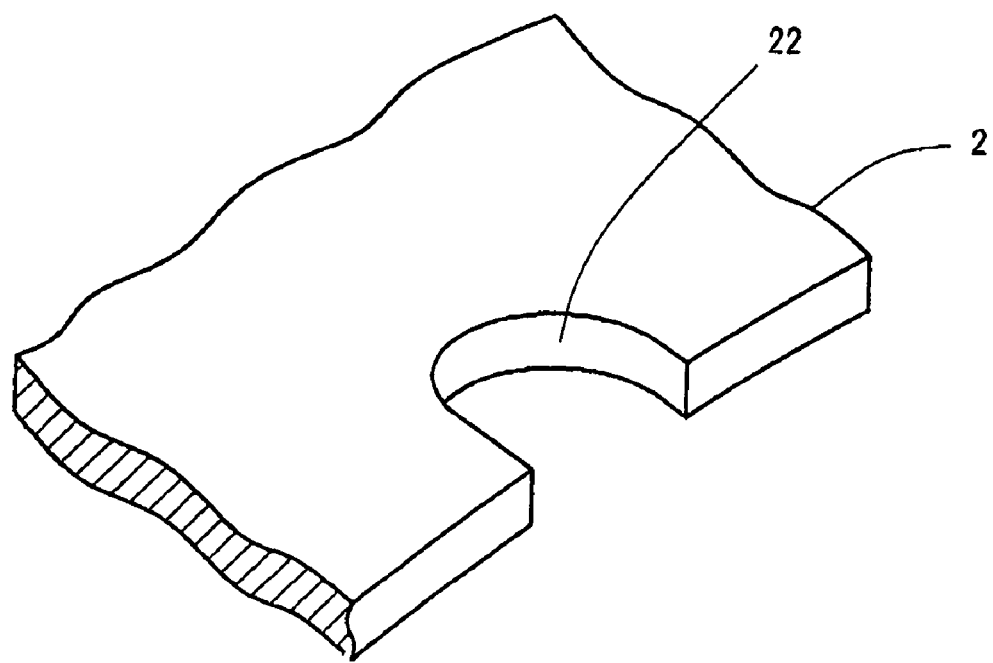

FIG. 11
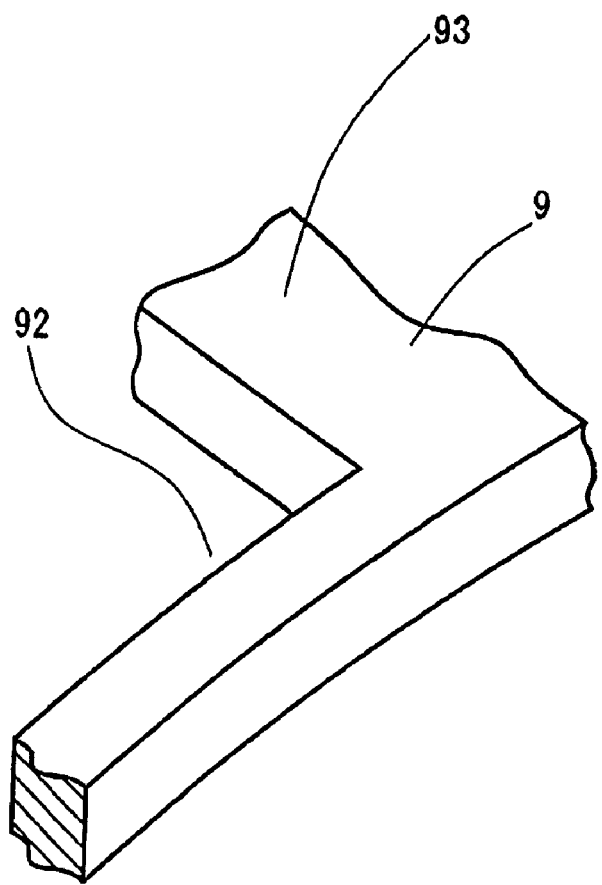
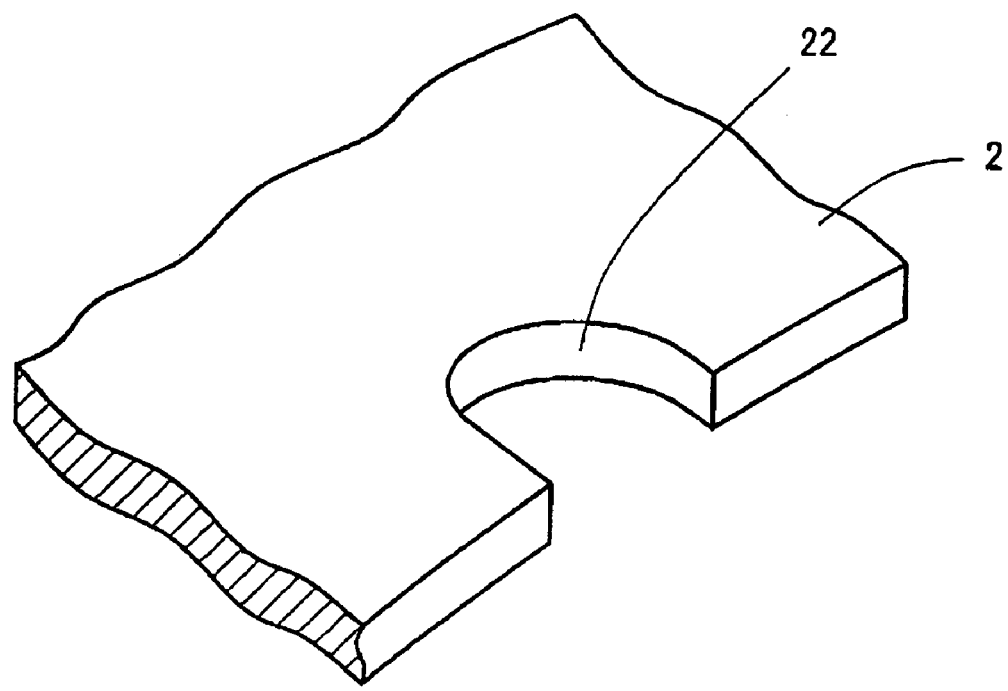

F I G. 1 2
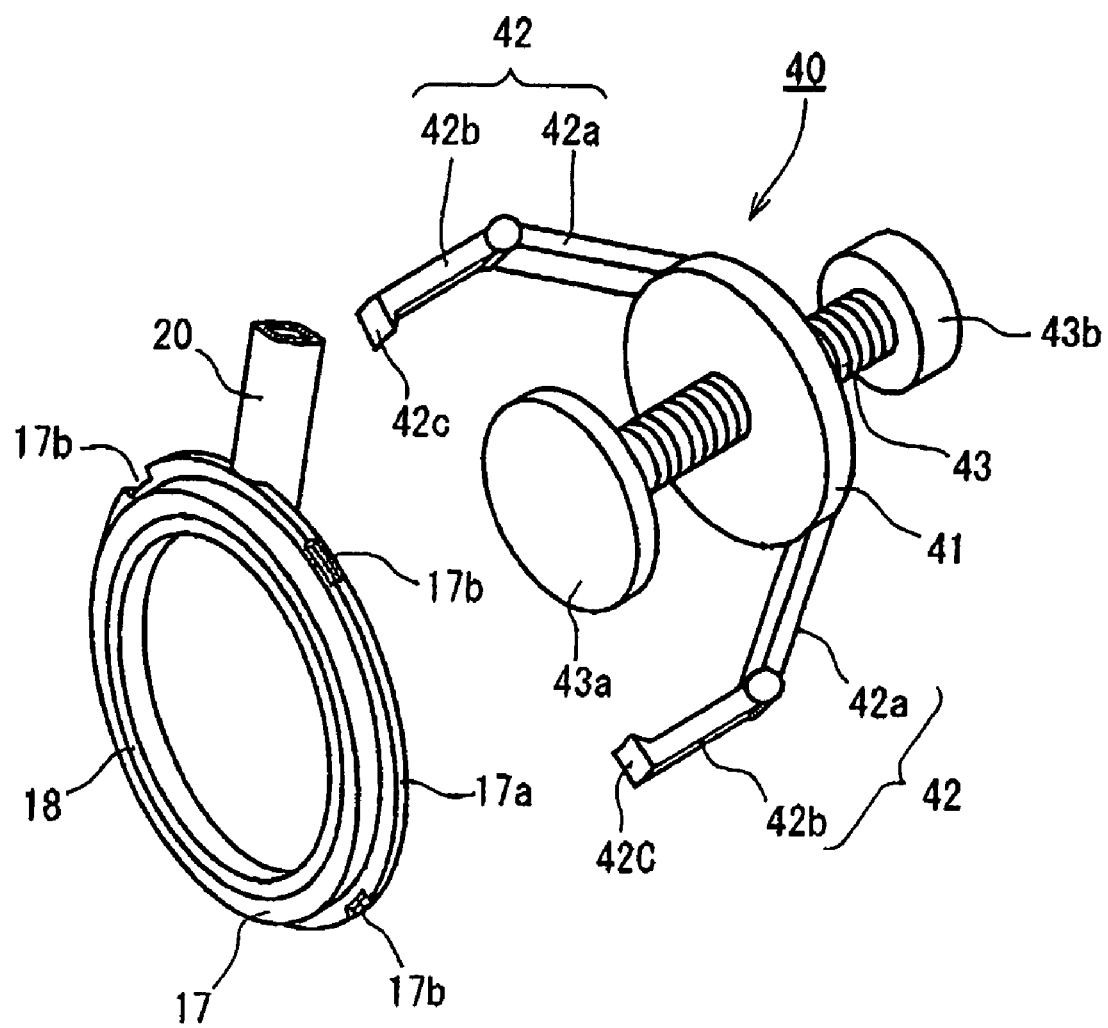

SENSOR ASSEMBLY, SEALING DEVICE, AND ROLLER BEARING APPARATUS FOR VEHICLES HAVING INTEGRATED CONNECTOR AND RING

BACKGROUND OF THE INVENTION

The present invention relates to a rolling bearing apparatus for vehicles for rotatably supporting an axle of a vehicle such as an automobile or the like on a vehicle body. More specifically, the present invention relates to a sensor assembly and a seal apparatus incorporated into a rolling bearing apparatus for vehicles.

Conventionally, there is a bearing apparatus for rotatably supporting an axle of an automobile with respect to a vehicle body, comprising a rotation detector used for ABS (anti-lock brake system) or the like (for example, refer to Japanese Laid-Open Patent Application Publication No. 8-43411). With such a bearing apparatus, a rolling member is interposed between the respective raceway surfaces of an inner ring outwardly fitted to the axle and serving as a rotating ring and an outer ring fixed to the vehicle body and serving as a fixed ring, and a clearance between the inner and the outer rings is sealed by a seal apparatus. A rotation detector is constituted so that a change in a magnetic field of a pulser ring fixed to the inner ring constituting the rotating ring is detected by a sensor and the detection signal is transmitted to an electronic circuit of the vehicle body via a wire harness.

Generally, the sensor is fixed to a knuckle and the electronic circuit is provided on the vehicle body. Therefore, since the knuckle is connected to a damper against swinging of the vehicle body during traveling, vibration of the vehicle body is not transmitted to the knuckle. Therefore, while the electronic circuit provided on the vehicle body vibrates with the swinging of the vehicle body, the sensor fixed to the knuckle is not affected by vibration of the vehicle body. Thus, there is the concern that the wire harness for connecting the sensor and the electronic circuit may be broken by vibration of the vehicle body.

In addition, in order to save space, a sensor for the latest ABS is contained in the seal apparatus, which is a seal pack and which is fitted on a bearing apparatus. Therefore, there is the problem that if the wire harness breaks and the ABS sensor is in an abnormal state, the entire hub unit, which contains the bearing apparatus, has to be replaced, making maintenance laborious and leading to expensive costs.

BRIEF SUMMARY OF THE INVENTION

In accordance with the present invention, a sensor assembly includes a seal ring, a sensor integrally provided in the above seal ring, an external member which molds the above sensor with resin to integrate the sensor and the above seal ring, and a sensor-side connector, one end being formed consecutive with said external member, and the other end constituted to be attachably/detachably connected to a wire harness-side connector.

Preferably, the other end of the above sensor-side connector is installed so as to extend radially outward.

Preferably, the above sensor is a magnetic sensor, the above seal ring is an outer ring side seal ring made of a nonmagnetic material, and the above magnetic sensor is arranged on an outer diameter side of the above outer ring side seal ring.

A seal apparatus of the present invention includes an outer ring-side seal ring which is fixed to an outer ring member and composed of a nonmagnetic material, an inner ring-side seal ring fixed to an inner ring member, a magnetic sensor provided on the outer diameter side of the above outer ring-side seal ring, a magnetic material ring which together with the above magnetic sensor constitutes a rotation detector and which is integrally provided in a position opposite in the radial direction to the above magnetic sensor in the above inner ring-side seal ring, an external member in which the above magnetic sensor is integrally resin molded with the magnetic sensor and the above outer ring-side seal ring, and a sensor-side connector, one end of which is consecutive with the above external member, and the other end of which is constituted to be attachably/detachably connected to a connector on the wire harness-side.

Preferably, the above magnetic material ring is a pulser ring in which N-poles and S-poles alternating in the circumferential direction are magnetized at a predetermined pitch.

A rolling bearing apparatus for vehicles of the present invention includes an outer ring member fixed to a vehicle body side, an inner ring member which is disposed concentrically with the above outer ring member, a plurality of rolling members which are rotatably disposed between the above outer ring member and the above inner ring member, an outer ring-side seal ring fixed to the above outer ring member, an inner ring-side seal ring that with the above outer ring-side seal ring constitutes a seal apparatus and is fixed to the above inner ring member, a magnetic sensor integrally provided in the above outer ring-side seal ring, an external member in which the above magnetic sensor is integrally resin molded with the magnetic sensor and the above outer ring-side seal ring, a sensor-side connector, one end of which is consecutive with the above external member, and the other end of which is constituted to be attachably/detachably connected to a wire harness-side connector, and a pulser ring which together with the above magnetic sensor constitutes a rotation detector and is fixed on a side of the above the inner ring-side seal ring.

Preferably, the other end of the above sensor-side connector is disposed so as to extend outward in the radial direction.

As the rotation detector, for example, an active type detector the output of which changes in accordance with a change in a magnetic flux is used; a magnetic material ring includes the pulser ring, and the magnetic sensor includes a magnetic sensor comprising two magnetic detection portions arranged circumferentially apart from each other.

According to the rolling bearing apparatus for vehicles of the present invention, the rotation detector comprising the magnetic sensor and the magnetic material ring are integrated with the seal apparatus, and the sensor-side connector connected to the magnetic sensor is formed to be consecutive with a resin-made external member in which the magnetic sensor is molded, so that the seal apparatus, the rotation detector, and the sensor-side connector are integrated.

The wire harness for connecting the magnetic sensor and an electronic circuit of the vehicle body is connected at one end to the electronic circuit and has at the other end a wire harness-side connector which is attachable/detachable with respect to the sensor-side connector which is integrated in the magnetic sensor, and the electronic circuit is connected to the magnetic sensor by connecting the wire harness-side connector to the sensor-side connector which is integrated with the magnetic sensor. Thus, the wire harness is separated from the integrated body comprising the seal apparatus, the rotation detector, and the sensor-side connector, so that when the wire harness is broken by swing of the vehicle body during traveling, it is easy to remove just the wire harness from the sensor-side connector portion for replacement, thereby making maintenance simple and inexpensive.

The wire harness is separated from the integrated body comprising the seal apparatus, the rotation detector, and the sensor-side connector, so that when the bearing apparatus is fixed to a knuckle in a state where the integrated body comprising the seal apparatus, the rotation detector, and the sensor-side connector is mounted to the bearing apparatus, there is no wire harness that interferes with the securing operation, thereby improving mountability in vehicles.

The magnetic sensor which is molded by the resin-made external member is provided in the outer ring-side seal ring, and the magnetic material ring is provided in the inner ring-side seal ring, so that the magnetic sensor and the magnetic material ring are integrated into the seal apparatus, thereby making the rotation detector more compact.

BRIEF DESCRIPTION OF THE DRAWINGS

Accompanying the specification are figures which assist in illustrating the embodiments of the invention, in which:

FIG. 3 is an expanded sectional view of a seal apparatus portion of FIG. 2;

FIG. 5(A) is a signal waveform diagram for one of the two magnetic detection portions constituting the magnetic sensor;

FIG. 5(B) is a signal waveform diagram for the other one of the two magnetic detection portions comprising constituting the magnetic sensor;

FIG. 6 is an explanatory diagram of the magnetic sensor;

FIG. 10 is a partial perspective illustration of an outer ring member and a knuckle according to another embodiment of the present invention;

FIG. 11 is a partial perspective illustration of an outer ring member and a knuckle according to a modification;

FIG. 12 is a perspective illustration of viewing an outer ring-side seal ring from the front side;

DETAILED DESCRIPTION OF THE INVENTION

Figure 1:
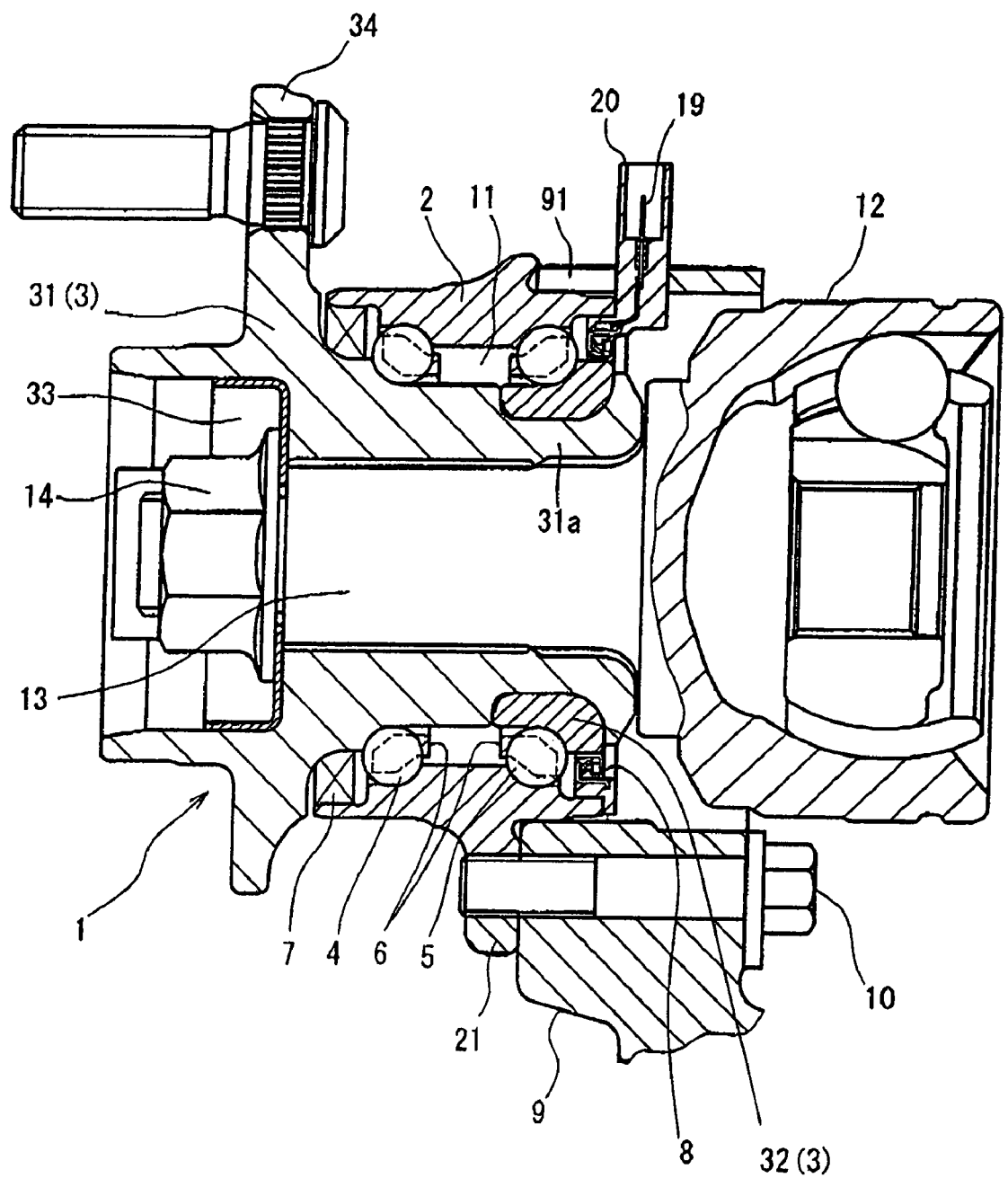
FIG. 1 is a cross-sectional view of a rolling bearing apparatus for vehicles according to a preferred embodiment of the present invention.

A rolling bearing apparatus for vehicles according to an embodiment of the present invention will be explained below in detail with reference to the drawings. A rolling bearing apparatus 1 for vehicles is used on the driving wheel side of an automobile. Turning to FIG. 1, the left side of the figure illustrates a vehicle's outer side and the right side is the vehicle's inner side. Although the rolling bearing apparatus 1 is for driving wheels, it can be also be used for a coupled driving wheel.

An outer ring member 2 is constituted such that a flange portion 21 formed on an outer peripheral surface thereof as a fixed ring is fixed to a knuckle 9 via a bolt 10, and the outer ring member 2 is thereby unrotatably supported by the vehicle body. Two outer ring raceway surfaces are formed on an inner peripheral surface of the outer ring member 2 in the axial direction. An inner ring member 3, as a rotating ring, is constituted by a hub wheel 31 and an inner ring 32. The hub wheel 31 and the inner ring 32 are rotatably supported by the outer ring member 2 via rolling members 4 and 5 which are constituted respectively by balls in rows disposed equidistantly in the circumferential direction arranged in a snap cage 6, respectively. A flange portion 34 is integrally formed facing outward in the radial direction on an outer peripheral surface of the vehicle outer side of the hub wheel 31. A brake disc rotor and a tire wheel are mounted on the flange portion 34, and a wheel is mounted on the tire wheel.

An outer peripheral surface more to the vehicle inner side than the flange portion 34 of the hub wheel 31 is used as an inner ring raceway surface for the rolling members 4 of one row. A cylindrical minor diameter portion 31a is formed on the hub wheel 31 vehicles outer side, and the inner ring 32 is outwardly fitted to an outer peripheral surface of this minor diameter portion 31a. An outer peripheral surface of the inner ring 32 is used as an inner ring raceway surface for the rolling members 5 of the other row. Fastened to an edge surface on the vehicle inner side of the inner ring 32 is an edge section deformed outwardly in the radial direction of the minor diameter portion 31a of the hub wheel 31.

A shaft portion 13 is integrally formed with a bowl-shaped outer ring member 12 of a constant-velocity joint. The shaft portion 13 is inserted in a central hole of the hub wheel 31 via a spline. A nut 14 is screwed to an edge section of the vehicle's outer side of the shaft portion 13, and is fastened to an end surface of a recess portion 33 of the hub wheel 31. With such a constitution, a required preload is applied to the rolling members 4 and 5 of both rows and the bowl-shaped outer ring member 12 is integrated with the hub wheel 31 to integrally rotate therewith.

Seal apparatuses 7 and 8 hermitically seal an annular bearing space 11 between the outer ring member 2 and the inner ring member 3 from both sides in the axial direction at the vehicle outer side and the vehicle inner side respectively. With such a constitution, the seal apparatuses 7 and 8 prevent a lubricant inside the annular bearing space 11 from leaking to the outside and prevent mud, water or the like from penetrating from the outside. The seal apparatus 7 is constituted, for example, by adhering a rubber lip (not shown) that is in sliding contact with the hub wheel 31 to a ring-shaped core metal (not shown) which is inwardly fitted to the outer ring member 2.

Turning to FIG. 3, the seal apparatus 8 is constituted by combining an outer ring-side seal ring 81, which is one component of the sensor assembly, and an inner ring-side seal ring 82. The sensor assembly is constituted by the outer ring-side seal ring 81, a magnetic sensor 15, an external member 17 and the like.

The outer ring-side seal ring 81 is attached on the outer ring member 2 side, and is constituted by a ring-shaped core metal 83, and a main lip 84 and an auxiliary lip 85 that cover this ring-shaped core metal 83. The ring-shaped core metal 83 includes a cylindrical portion 83a extending in the axial direction, and a ring-shaped plate portion 83b extending inwardly in the radial direction from an axial direction inner edge side of the cylindrical portion 83a. The ring-shaped core metal 83 is a nonmagnetic material ring, and is made of a nonmagnetic material such as nonmagnetic stainless steel or the like.

The inner ring-side seal ring 82 is attached on the inner ring 32 side, and is constituted by a ring-shaped core metal 86 and an axial direction lip 87 and a radial direction lip 88 that cover this ring-shaped core metal 86. The ring-shaped core metal 86 comprises a cylindrical portion 86a which extends in the axial direction and radially opposes the cylindrical portion 83a, and a ring-shaped plate portion 86b which extends radially outwardly from an axial direction outer edge side of the cylindrical portion 86a, and axially opposes the ring-shaped plate portion 83b. The respective lips 84, 85, 87, and 88 are constituted by a rubber such as nitrile butadiene rubber (NBR) or the like, and are vulcanized to adhere to the ring-shaped core metal 83 and 86.

The magnetic sensor 15 for detecting a rotating state of the inner ring member is integrally incorporated in the outer ring-side seal ring 81 and the pulser ring 16 constituting a magnetic material ring is integrally incorporated in the inner ring-side seal ring 82. The rotation detector for detecting the rotation of the inner ring 32 is constituted by the magnetic sensor 15 and the pulser ring 16.

The magnetic sensor 15 is mounted in non-contact fashion above the outer peripheral surface of the cylindrical portion 83a in the ring-shaped core metal 83 of the outer ring-side seal ring 81, and is provided by means of integrally molding (insert molding) the external member 17 which resin molds the magnetic sensor 15 on the outer diameter of the cylindrical portion 83a. The external member 17 is constituted by an engineering plastic such as poly-phenylene-sulphide (PPS), poly-butylene-terephthalate (PBT), poly-amide (PA) or the like.

Figure 2:
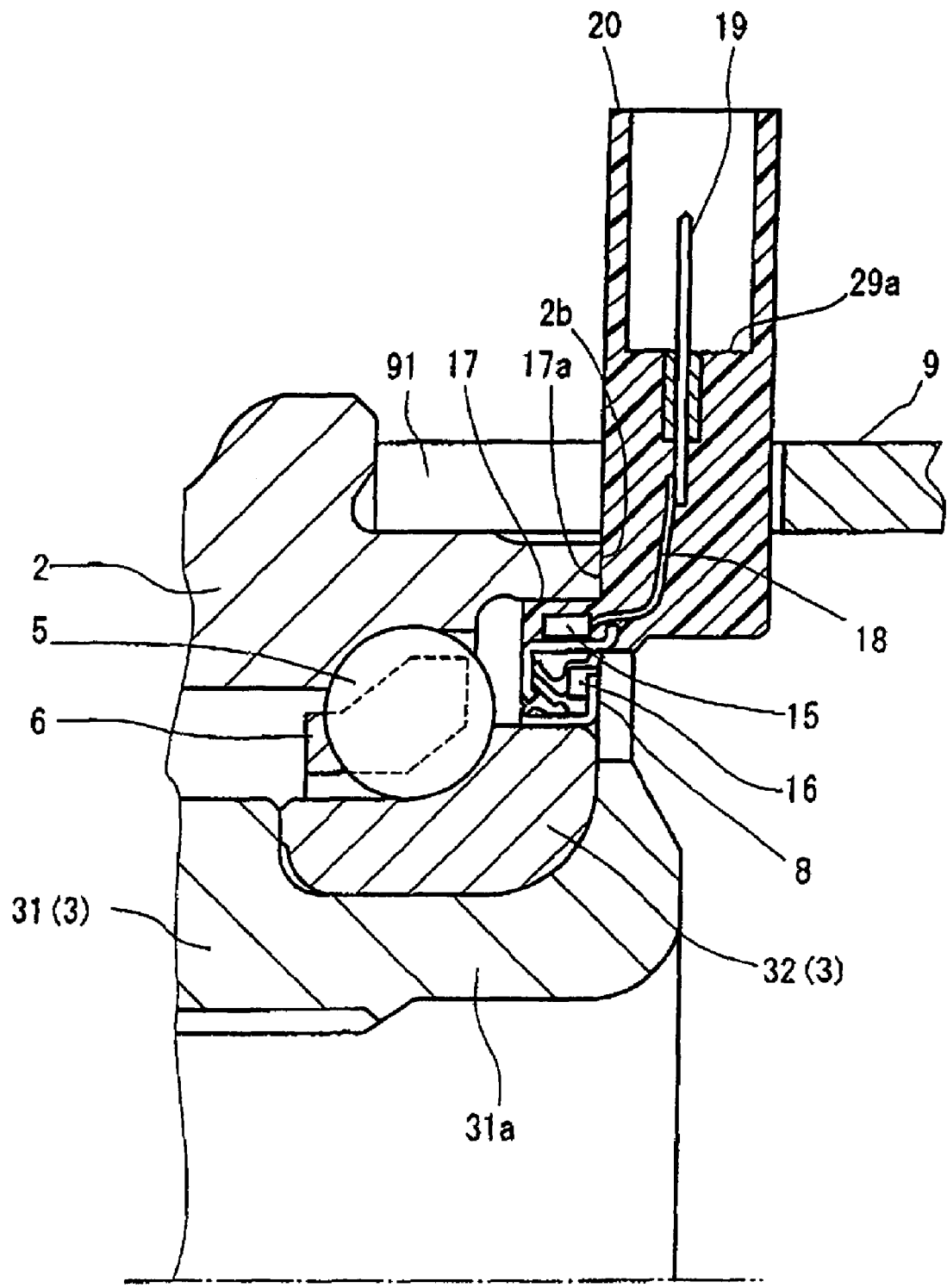
FIG. 2 is an expanded sectional view of a principal part of FIG. 1.

Turning to FIG. 2, a sensor-side connector 20 is integrally molded with the external member 17. The sensor-side connector 20 is constituted so that one end thereof is disposed on the external member 17 and the other end thereof extends in the outer diameter direction, and is attachably/detachably connected to a wire harness-side connector (not shown) connected to an electronic circuit of the vehicle body. The sensor-side connector 20 is preferably constituted by an engineering plastic, such as PPS, PBT, PA, or the like. A pin 19 for connection with the wire harness-side connector protrudes from a bottom face of a recess portion 29a on the other end side inside the sensor-side connector 20, and the magnetic sensor 15 and the pin 19 are connected with a signal line 18.

Figure 4:
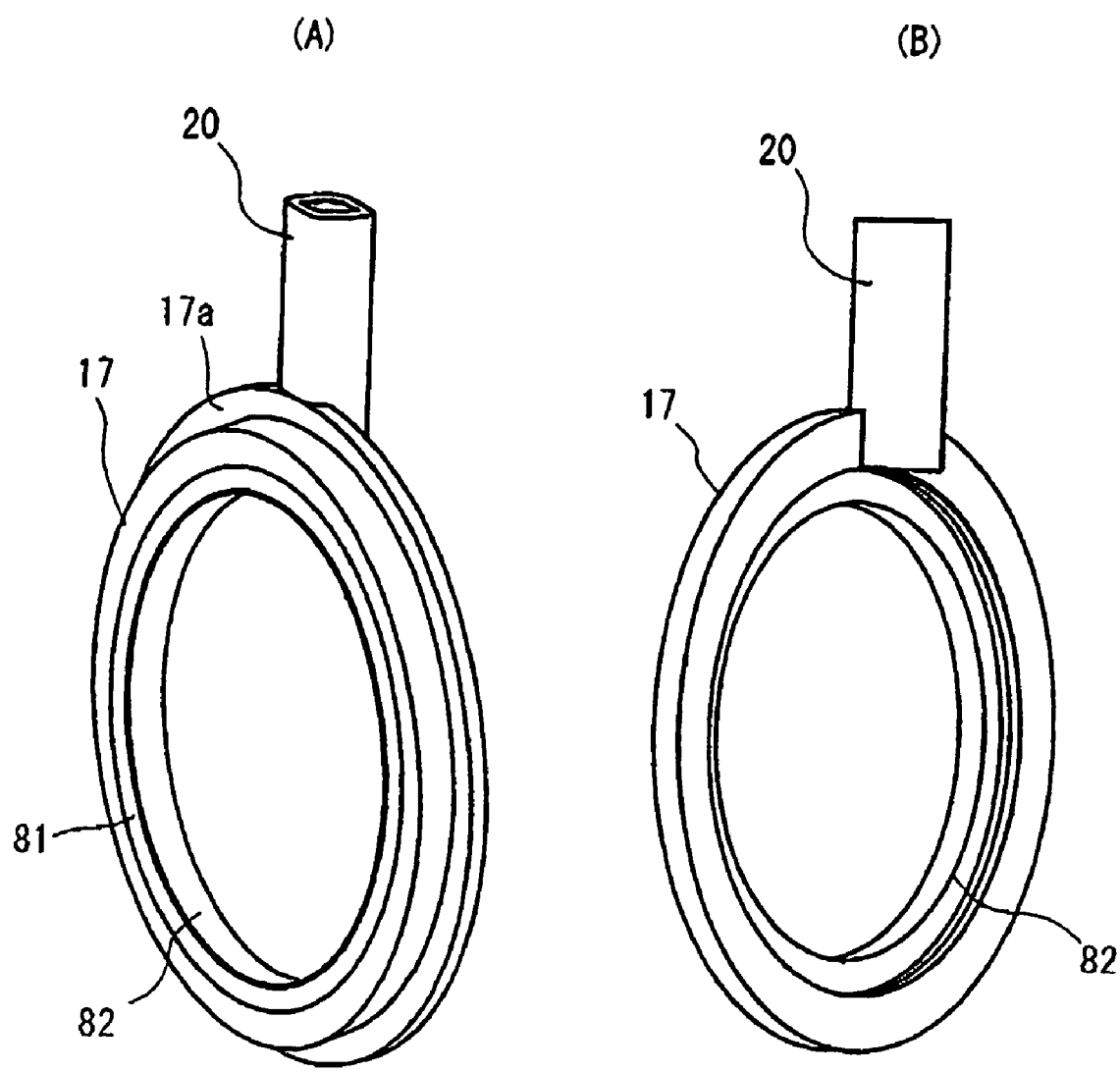
FIG. 4(A) is a front side perspective illustration of the seal apparatus.
FIG. 4(B) is a rear side perspective illustration of the seal apparatus.

A ring-shaped outer ring member contact surface 17a which contacts an axial end face 2b of the outer ring member 2 is formed on the external member 17, as shown FIGS. 4(A) and 4(B). A claw for interlocking with the wire harness-side connector may be provided on a periphery of the sensor-side connector 20.

The magnetic sensor 15 is constituted by two magnetic detection portions which are disposed separated from each other in the circumferential direction and comprise a Hall element, a magnetoresistive element or the like; it detects rotational direction in addition to rotational angle. The rotational phase relationship between detection signals of the two magnetic sensor portions is such that the magnetic sensors are arranged such that when one magnetic sensor produces a first rectangular wave signal as shown in FIG. 5(A), the other magnetic sensor produces a second rectangular wave signal, the phase of which is shifted from that of the first rectangular signal by 90 degrees, as shown in FIG. 5(B). Whether the rotational direction of the inner ring 3 is to the right or to the left is determined based on the phase advance or phase delay between both detection signals that the respective magnetic detection portions produce.

A Hall IC in which two Hall elements 22 are embedded, as shown in FIG. 6, is preferably used in the magnetic sensor 15 as the magnetic detection portion. That is, two Hall elements 22 are arranged with an interval of λ/4 so that a phase differential between outputs from respective Hall elements may be 90 degrees with respect to a magnetizing pitch λ of the pulser ring 16, thereby making it possible to detect the rotational direction. The magnetizing pitch λ is a total length of magnetization of a N-pole and S-pole.

As illustrated in FIG. 3, the pulser ring 16 is formed by vulcanizing and molding rubber that includes a magnetic powder, and is magnetized with a configuration such that, for example, N-pole pieces and S-pole pieces are alternatingly disposed in the circumferential direction. The pulser ring 16 is fixed to an inner surface of the ring-shaped plate portion 86b in the ring-shaped core metal 86 of the inner ring-side seal ring 82. The magnetic sensor 15 is fixed to a position at which it is capable of detecting a change in the magnetic field of the pulser ring 16. Incidentally, the sensing direction (inner diameter direction) of the magnetic sensor 15 and the magnetized direction (axial direction) of the pulser ring 16 are orthogonal to each other.

The seal apparatus 8 is constituted so that, with respect to the outer ring-side seal ring 81 in which the magnetic sensor 15 is incorporated, the external member 17 is press-fitted to a shoulder portion 2a of the inner peripheral surface of the outer ring member 2; and with regard to the inner ring-side seal ring 82 in which the pulser ring 16 is mounted, the ring-shaped core metal 86 is press-fitted to a shoulder portion 32a of the outer peripheral surface of the inner ring 32. The seal apparatus 8 is thereby attached tightly to the outer ring member 2 and the inner ring 32. The seal apparatus 8 is positioned such that an outer ring contact surface 17a is in contact with the axial direction end face 2b of the outer ring member 2.

In accordance with the rolling bearing apparatus 1 thus constituted, as illustrated in FIG. 1, the edge section on the vehicle inner side of the outer ring member 2 is inwardly fitted to the knuckle 9, and the flange portion 21 of the outer ring member 2 is fixed to the knuckle 9 with the bolt 10. The knuckle 9 is formed into a cylindrical shape, and as shown in FIGS. 1, 2, and, in particular, 7, a notch portion 91 in which the sensor-side connector 20 is inserted is formed on the vehicle 10 outer side. The rolling bearing apparatus 1 is fixed to the knuckle 9 in a state where the sensor-side connector 20 has been inserted in the notch portion 91.

Turning again to FIG. 2, the wire harness-side connector is provided at the tip of the wire harness connected to the electronic circuit of the vehicle body. The sensor-side connector 20 is attachably/detachably connected to this wire harness-side connector. Since the wire harness-side connector is connected to the sensor-side connector 20, the magnetic sensor 15 is connected to the electronic circuit of the vehicle body via the connection with the sensor-side connector 20 and the wire harness-side connector.

In accordance with the rolling bearing apparatus 1 described above, when the inner ring member 3 is rotated in a state where the outer ring member 2 is unrotatably fixed to the knuckle 9, the respective pole pieces of the pulser ring 16 that integrally rotate with the inner ring member 3 successively oppose the respective magnetic detection portions of the magnetic sensor 15. At such time, the position of the pulser ring 16 opposed to the magnetic detection portions of the magnetic sensor 15 is successively changed, so that the direction of the magnetic fluxes generated from the pulser ring 16 alternates, and first and second rectangular wave signals are output from the magnetic sensor 15. The waveform period of each of these rectangular wave signals is changed according to the rotational phase and rotational speed of the pulser ring 16. By processing the waveform of each rectangular wave signal, the rotational phase, the rotational speed, the rotational frequency, the rotational direction and the like of the inner ring member 3 are determined.

In accordance with the rolling bearing apparatus 1 described above, the wire harness is separated from the integrated body constituted by the seal apparatus 8, the magnetic sensor 15, the pulser ring 16, and the sensor-side connector 20. Because of this separation, when the wire harness is broken by swing of the vehicle body during traveling, the wire harness-side connector can be removed with ease from the sensor-side connector to replace the wire harnesses, thereby making maintenance easy and inexpensive.

Since the wire harness is separated from the integrated body constituted by the seal apparatus 8, the magnetic sensor 15, the pulser ring 16, and the sensor-side connector 20, when the rolling bearing apparatus 1 is fixed to the knuckle 9 in a state where such integrated object is fitted onto the rolling bearing apparatus 1, there is no wire harness interfering with the fixing operation, thereby improving mountability in vehicles.

The pulser ring 16 is provided in the ring-shaped core metal 86 of the inner ring-side seal ring 82, and the magnetic sensor 15 is provided on the ring-shaped core metal 83 of the outer ring-side seal ring 81, so that the pulser ring 16 and the magnetic sensor 15 are integrated in the seal apparatus 8. According to this integrated configuration, the rotation detector can be made compact and it can be installed with ease even in a small space such as the driving wheel side.

Turning again to FIG. 3, the pulser ring 16 is fixed to the ring-shaped core metal 86 of the inner ring-side seal ring 82, and the magnetic sensor 15 is resin molded by the external member 17 so as to be integrated in the ring-shaped core metal 83 of the outer ring-side seal ring 81, improving the sealing performance of the pulser ring 16 and the magnetic sensor 15. Such a constitution improves dust resistance of the rolling bearing apparatus.

Since the signal line 18 of the magnetic sensor 15 is resin molded by the external member 17, a connection part between the magnetic sensor 15 and the signal line 18 is reinforced, preventing breakage of the signal line 18. Furthermore, since the wire harness is separated from the integrated body constituted by the seal apparatus 8, the magnetic sensor 15, the pulser ring 16, and the sensor-side connector 20, the wire harness weight is not applied on the external member 17, thereby preventing degradation of the sealing performance of the external member 17 due to lack of strength while the wire harness is attached to the connector 20.

The sensor-side connector 20 is integrally formed in the external member 17 which resin molds the magnetic sensor 15 of the outer ring-side seal ring 81, giving it excellent insulation and vibration resistance performance, and lowering costs.

Figure 7:
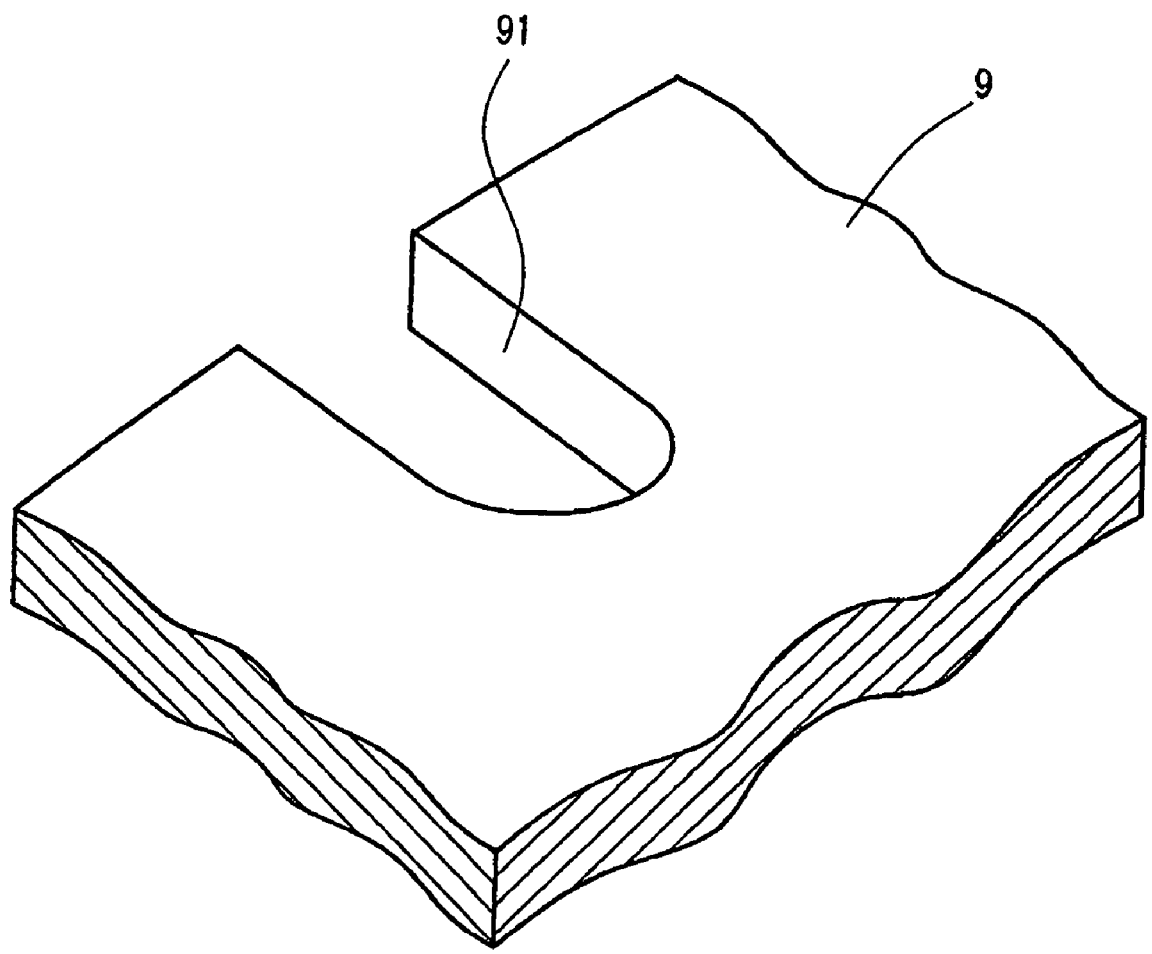
FIG. 7 is a partial perspective illustration of a knuckle.

The sensor-side connector 20 is inserted in the notch portion 91 formed on the vehicle outer side of the knuckle 9, so that it is not necessary to form a through hole at a midway point of the axial direction of the knuckle 9 as in the conventional art. This helps prevent deterioration of strength of the knuckle 9. Furthermore, since the sensor-side connector 20 projecting in the outer diameter direction fits into the notch portion 91 (FIGS. 1 and 7) from the vehicle's outer side in a state where the rolling bearing apparatus 1 is provided with the seal apparatus 8 in which the sensor-side connector 20 is integrally formed, the rolling bearing apparatus 1 can be fixed to the knuckle 9 with ease.

Since the magnetic sensor 15 is molded by the external member 17 and is integrally formed with the outer ring-side seal ring 81, the magnetic sensor 15 is protected from the external environment, thereby improving reliability.

Another embodiment of the present invention will be explained with reference to FIGS. 8 through 10.

In accordance with a rolling bearing apparatus of this embodiment, notchs 22 and 91 having a U-shape, V-shape or similar shape through which the connector 20 penetrates are formed in the outer ring member 2 and the knuckle 9, respectively. An edge section in the axial direction of the outer ring member 2 is installed in an extending manner on the vehicle's inner side further inward than an edge section in the axial direction of the inner ring member 3 (edge surface in the axial direction of the cylindrical minor diameter portion 31a of the hub wheel 31). The notch 22 is formed in an extended edge section on the vehicle inner side of the outer ring member 2.

In the seal apparatus 8 on the vehicle inner side, in a state where the seal rings 81 and 82 have been assembled, with respect to the outer ring-side seal ring 81, the external member 17 is press-fitted to the shoulder portion 2a of the inner peripheral surface of the outer ring member 2; and with respect to the inner ring-side seal ring 82, the ring-shaped core metal 86 is press-fitted to a shoulder portion 32a of the outer peripheral surface of the inner ring 32. The seal apparatus 8 is thereby attached tightly to the outer ring member 2 and the inner ring 32. The sensor-side connector 20 extends radially outwardly from the external member 17, and the sensor-side connector 20 is inserted in the notch 22 of the outer ring member 2 for positioning.

Next, in the rolling bearing apparatus 1 according to this embodiment, an edge section on the vehicle inner side of the outer ring member 2 is inwardly fitted to the knuckle 9 from the vehicle outer side, and the flange portion 21 of the outer ring member 2 is fixed to the knuckle 9 with the bolt 10. The knuckle 9 is formed into a cylindrical shape, the notch portion 91 in which the sensor-side connector 20 is inserted is formed on the vehicle's outer side, and the rolling bearing apparatus 1 is fixed to the knuckle 9 in a state where the sensor-side connector 20 is inserted in the notch portion 91. The same operational effects as with the embodiment shown in FIGS. 1 through 7 can be obtained in a rolling bearing apparatus 1 thus constituted.

The axial direction edge section of the outer ring member 2 is disposed in an extending manner further to the inside of the vehicle than the axial direction edge section of the inner ring member 3, and in a state where the external member 17 is press-fitted to the shoulder portion 2a of the outer ring member 2, the area of the outer peripheral surface 17b of the external member 17 that is in contact with the shoulder portion 2a is increased. Thus the press fit strength with respect to the shoulder portion 2a of the external member 17 is improved.

Figure 9:
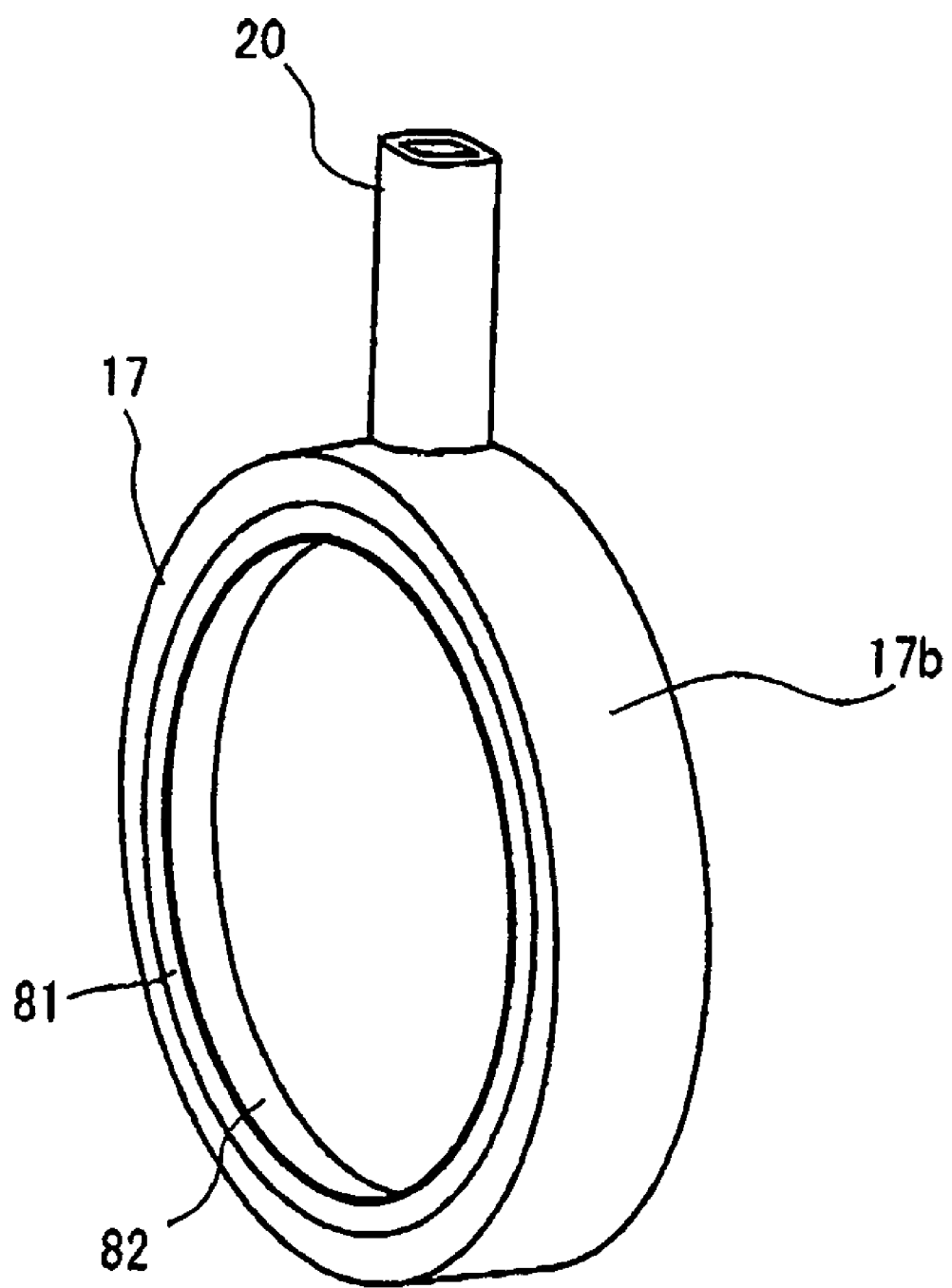
FIG. 9 is a partial perspective illustration of the seal apparatus of FIG. 8.

The external member 17, as shown in FIG. 9, may be constituted so that the axial width of the outer peripheral surface 17b is not increased for the entire circumferential direction, but rather for only the portion of the sensor-side connector 20.

Figure 8:
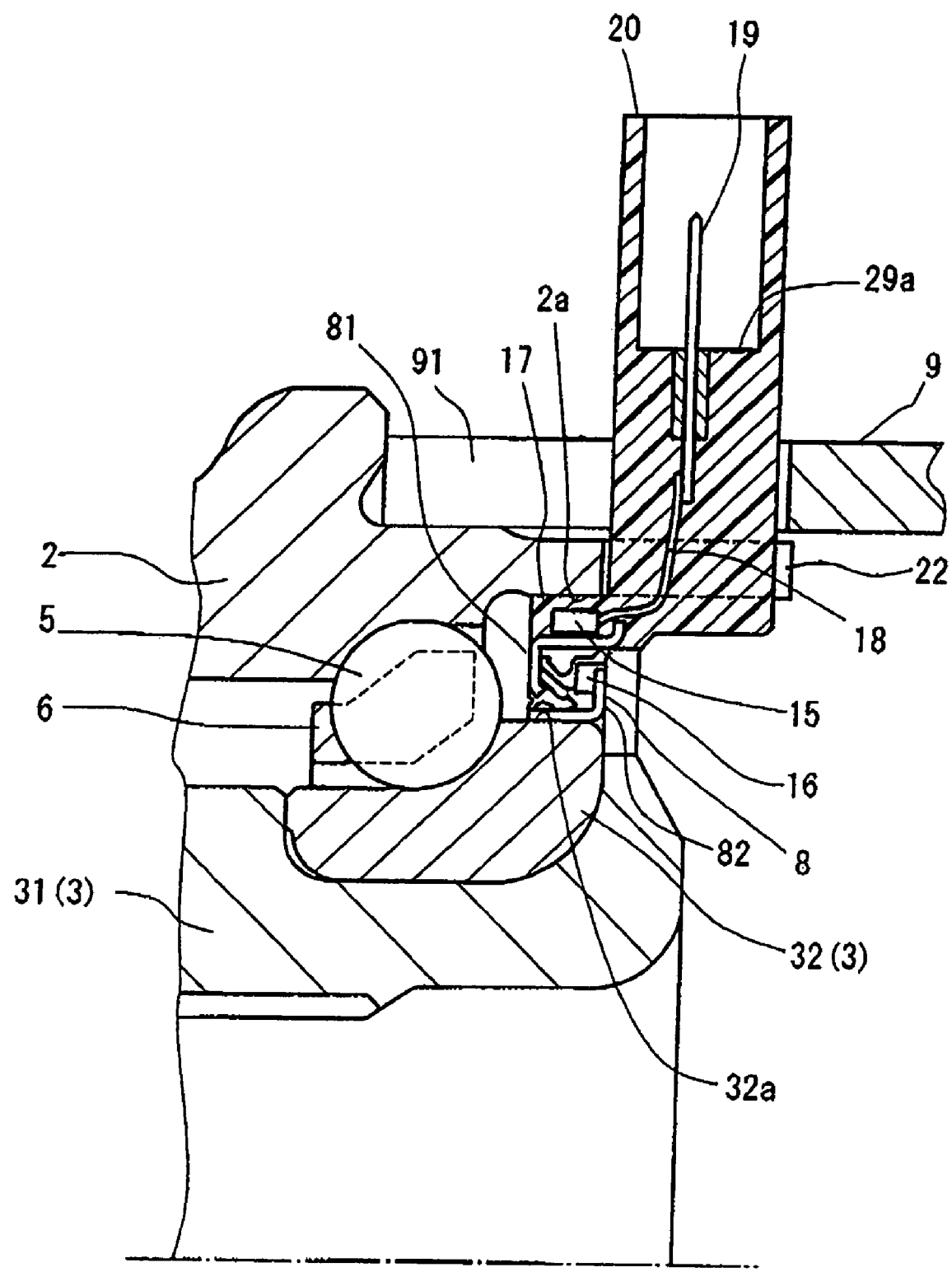
FIG. 8 is a cross-sectional view showing an enlarged principal part of the rolling bearing apparatus for vehicles according to another embodiment of the present invention.

A modification of the rolling bearing apparatus according to this embodiment shown in FIGS. 8 through 10 is shown in FIG. 11. FIG. 11 is a partial perspective illustration of the outer ring member 2 and the knuckle 9 according to the modification. This modification is constituted so that the vehicle outer side of the knuckle 9 is formed so as to be recessed toward the vehicle inner side with the exception of a fixed portion 93 to the support flange 21, leaving a space 92. The sensor-side connector 20 is made to pass through the notch 22 of the outer ring member 2 and the space 92 of the knuckle 9, so that the rolling bearing apparatus 1 can be fixed to the knuckle 9 without interference from the sensor-side connector.

Figure 13:
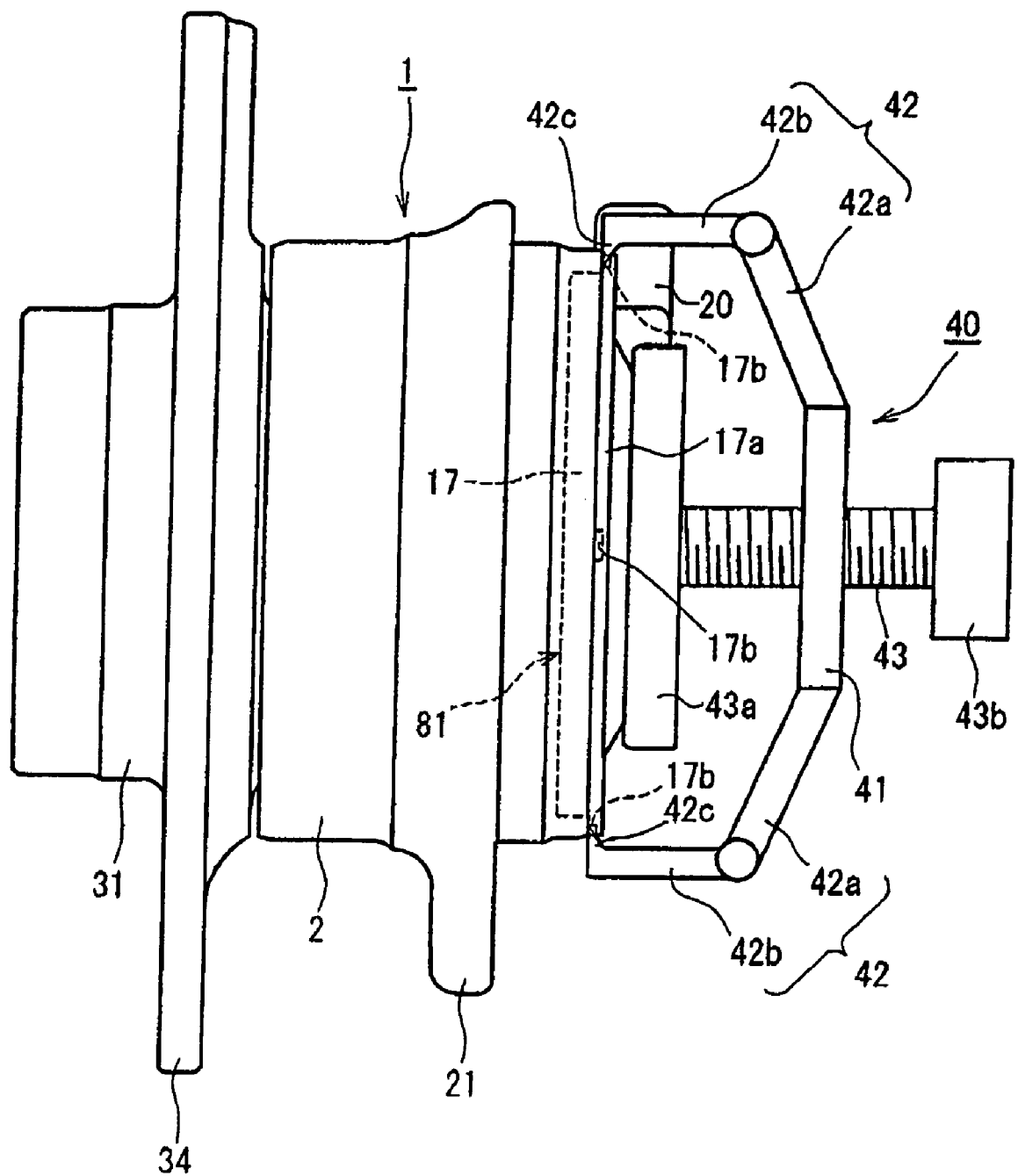
FIG. 13 is a side view showing circumstance when the outer ring-side seal ring is removed from the rolling bearing apparatus.

As seen in FIGS. 12 and 13, which illustrate another embodiment of the invention, the outer ring-side seal ring 81 with which the magnetic sensor 15 is integrated is constituted so as to be easily removed using a removal jig 40. The removal jig 40 comprises a circular body 41, a pair of arms 42 and 42 respectively fixed to upper and lower positions opposing each other at 180 degrees at the outer circumferential edge of the body 41, and a screw axis 43 which penetrates a center of the body 41 and is screwed therein. The arm 42 comprises a fixed link 42a fixed to the body 41, and a movable link 42b bendably attached to a tip of the fixed link 42a via a joint. A claw 42c is provided at a tip of the movable link 42b. A circular backing pad 43a which contacts an end face of the vehicle's inner side of the hub wheel 31 is integrally provided at one end of the screw axis 43. A rotational operating knob 43b is integrally provided at the other end of the screw axis 43.

A notch 17b serving as a hook portion on which the claw 42c of the removal jig 40 is hooked is provided in several places on the periphery (for example, four places equidistantly disposed in the circumferential direction) of the flange portion 17a in the external member 17 of the outer ring-side seal ring 81.

An explanation will now be made of the procedure for removing the outer ring-side seal ring 81. In a state where the outer ring-side seal ring 81 is attached to a shoulder portion of the inner peripheral surface of the outer ring member 2, a depression is made between the notch 17b and the edge section on the vehicle inner side of the outer ring member 2. As shown in FIG. 13, in a state where the backing pad 43a of the removal jig 40 is in contact with the end face of the vehicle inner side of the hub wheel 31, the claws 42c and 42c at the heads of the arms 42 and 42 of the removal jig 40 are then hooked to the depression mentioned above to turn the screw axis 43. The body 41 and the arms 42 and 42 are thereby rotated, so that the outer ring-side seal ring 81 is drawn out together with this body 41 to be removed from the outer ring member 2.

As described above, the outer ring-side seal ring 81 can be easily removed using the removal jig 40, so that even when the magnetic sensor 15 integrated with the outer ring-side seal ring 81 is not functioning properly, it is possible to replace it quickly and simply.

Figure 14:
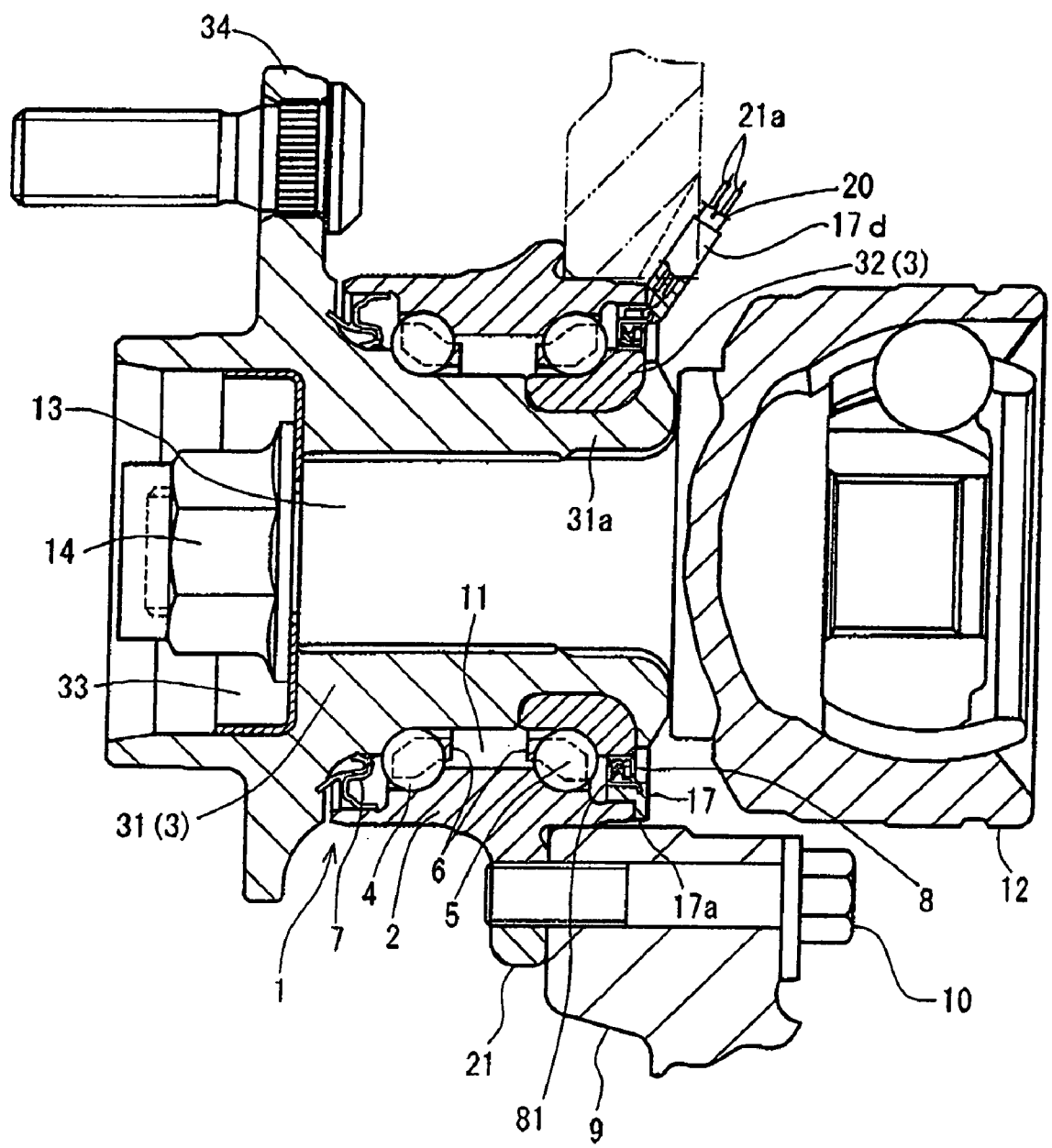
FIG. 14 is a cross-sectional view further showing a rolling bearing apparatus for vehicles according to another embodiment of the present invention.
Figure 15:
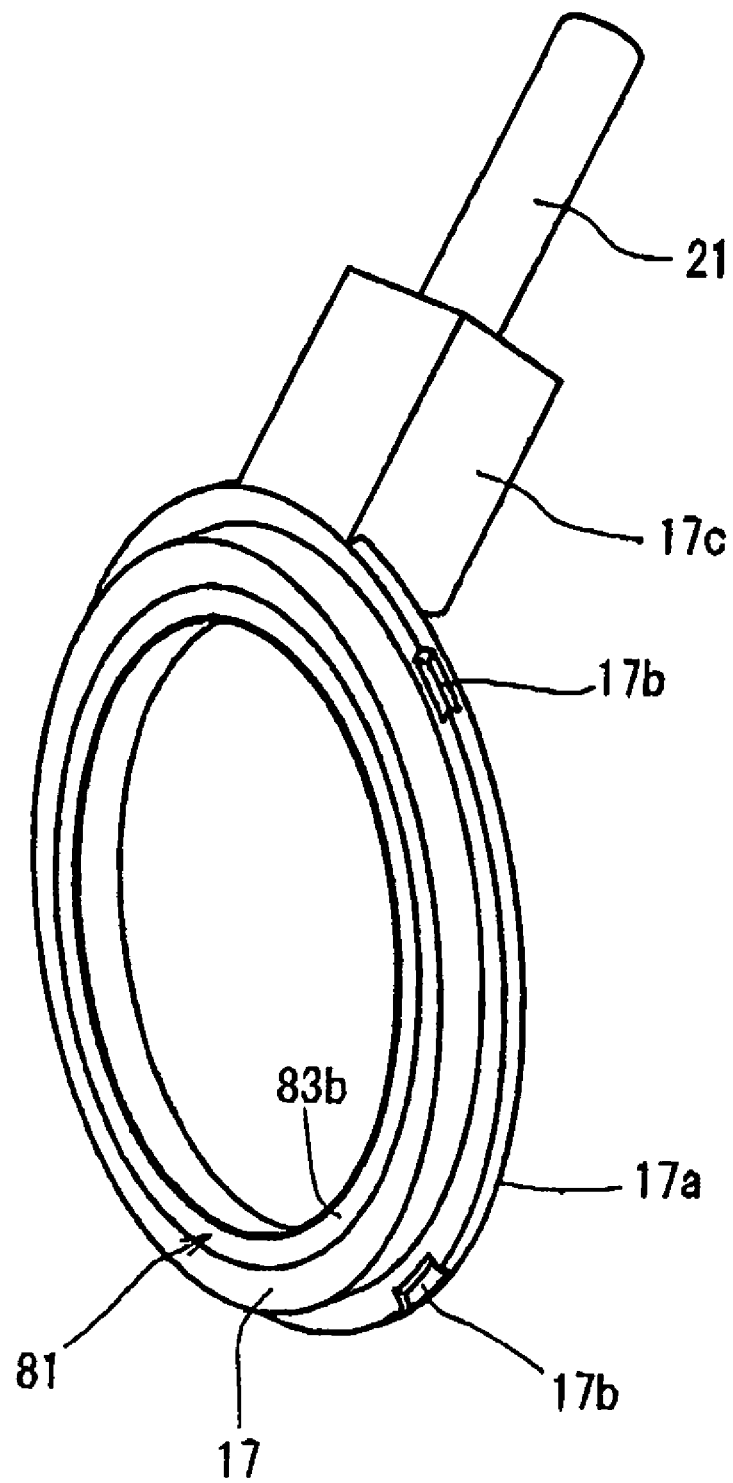
FIG. 15 is a perspective illustration of the outer ring-side seal ring used for the rolling bearing apparatus for vehicles of FIG. 14 as seen from the front side.

Incidentally, with regard to the outer ring-side seal ring 81 with which the magnetic sensor 15 is integrated, as shown in FIGS. 14 and 15, there may also exist a type such that the wire harness 21 is embedded in the external member 17 without a sensor-side connector 20 being provided, and the signal line 21a of this wire harness 21 is directly connected to the magnetic sensor 15. Incidentally, a protrusion 17c for preventing the wire harness 21 from bending is provided projecting outward radially in a slanting direction at a predetermined peripheral position of the external member 17. Also, with regard to such a type of the outer ring-side seal ring 81, a notch 17b is provided in the external member 17 that is the same as that of the embodiment described above.

The present invention may also include a rotation detector without a seal function. Although not shown in the figures, for example, with regard to the outer ring-side seal ring 81, the sensor assembly may be constituted without the ring-shaped plate portion 83b and the lips 84 and 85 of the ring-shaped core metal 83, and with regard to the inner ring-side seal ring 82, this may be constituted without the lips 87 and 88. Even in a rotation detector thus constituted, the notch 17b is provided in the external member 17 just as in the embodiment described above. The above hook portion to the external member 17 can be constituted by making a depression in a radial direction end surface of the flange portion 17a of the external member 17 instead of the notch 17b.

In use, the present invention can be applied to a rolling bearing apparatus for rotatably supporting an axle of a vehicle such as an automobile or the like with respect to a vehicle body.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. A rolling bearing apparatus for vehicles, said apparatus being adapted for detachably connecting to a wire harness side connector, said apparatus comprising:
    an outer ring member, said outer member being fixed to the vehicle body;
    an inner ring member, said inner member being concentrically disposed with said outer ring member;
    a plurality of rolling members, said rolling members being rotatably disposed between said outer ring member and said inner ring member;
    an outer ring side seal ring, said outer seal ring being fixed to said outer ring member;
    an inner ring side seal ring, said inner seal ring and said outer seal ring forming a seal apparatus, said seal apparatus being fixed to said inner ring member;
    a magnetic sensor, said magnetic sensor being integrally provided in said outer seal ring;
    an external member, said external member molding said magnetic sensor with resin for integrating said magnetic sensor and said outer seal ring;
    a sensor side connector, said connector having one end, said one end being formed consecutive with said external member, said connector having another end, the other end being adapted for detachably connecting to the wire harness side connector; and
    a pulser ring, said pulser ring and said magnetic sensor forming a rotation detector, said rotation detector being fixed on said inner seal ring,
    wherein said outer ring member further comprises a notch and said sensor side connector being inserted in said notch so that said outer ring member connects to the vehicle body side.

2. The rolling bearing apparatus of claim 1, wherein the other end of said sensor side connector extends radially outwardly.

3. The rolling bearing apparatus of claim 1, wherein:
said outer ring side seal ring includes a first cylindrical pordon, said first cylindrical portion extending axially;
said outer ring side seal ring including a second ring shaped plate portion, said second plate portion extending radially inwardly from an axial inner edge portion of said first cylindrical portion;
said magnetic sensor being integral with an outer peripheral surface of said first cylindrical portion in a non contact manner, said external member molding said magnetic sensor with resin; and
said inner ring side seal ring including a second cylindrical portion, said second cylindrical portion extending axially and radially opposing said first cylindrical portion;
said inner seal ring including a second ring shaped plate portion, said second plate portion extending radially outwardly from an axial outer edge portion of said second cylindrical portion, said plate portion axially opposing said first ring shaped plate portion; and
said pulser ring being attached to an inner surface of said second ring shaped plate portion so that said pulser ring radially opposes said magnetic sensor.

4. The rolling bearing apparatus of claim 1, wherein:
the inner ring member has an inner ring axial end portion extending toward a vehicle facing side of the roller bearing apparatus;
the outer ring member has an outer ring axial end portion extending toward further the vehicle facing side of the roller bearing apparatus than the inner ring axial end portion; and
said notch is disposed in the outer ring axial end portion.

5. A rolling bearing apparatus for vehicles, said apparatus being adapted for detachably connecting to a wire harness side connector, said apparatus comprising:
an outer ring member, said outer member being fixed to the vehicle body;
an inner ring member, said inner member being concentrically disposed with said outer ring member;
a plurality of rolling members, said rolling members being rotatably disposed between said outer ring member and said inner ring member;
an outer ring side seal ring, said outer seal ring being fixed to said outer ring member;
an inner ring side seal ring, said inner seal ring and said outer seal ring forming a seal apparatus, said seal apparatus being fixed to said inner ring member;
a magnetic sensor, said magnetic sensor being integrally provided in said outer seal ring;
an external member, said external member molding said magnetic sensor with resin for integrating said magnetic sensor and said outer seal ring;
a sensor side connector, said connector having one end, said one end being formed consecutive with said external member, said connector having another end, the other end being adapted for detachably connecting to the wire harness side connector; and
a pulser ring, said pulser ring and said magnetic sensor forming a rotation detector, said rotation detector being fixed on said inner seal ring,
wherein said vehicle body side comprises a notch and said sensor side connector being inserted in said notch so that said outer ring member connects to the vehicle body side.

6. The rolling bearing apparatus of claim 5, wherein the other end of said sensor side connector extends radially outwardly.

7. The rolling bearing apparatus of claim 5, wherein:
said outer ring side seal ring includes a first cylindrical portion, said first cylindrical portion extending axially;
said outer ring side seal ring including a second ring shaped plate portion, said second plate portion extending radially inwardly from an axial inner edge portion of said first cylindrical portion;
said magnetic sensor being integral with an outer peripheral surface of said first cylindrical portion in a non contact manner, said external mentor molding said magnetic sensor with resin; and
said inner ring side seal ring including a second cylindrical portion, said second cylindrical portion extending axially and radially opposing said first cylindrical portion;
said inner seal ring including a second ring shaped plate portion, said second plate portion extending radially outwardly from an axial outer edge portion of said second cylindrical portion, said plate portion axially opposing said first ring shaped plate portion; and
said pulser ring being attached to an inner surface of said second ring shaped plate portion so that said pulser ring radially opposes said magnetic sensor.

8. A sensor assembly, said assembly being adapted for detachably connecting to a wire harness-side connector, said sensor assembly comprising:
a seal ring;
a sensor integrally provided in said seal ring;
an external member, said external member molding said sensor with resin for integrating said sensor and said seal ring; and
a sensor side connector, said connector having one end, said one end being formed consecutive with said external member, said connector having another end, said other end being adapted for detachably connecting to the wire harness side connector,
wherein a hook portion is provided at a predetermined peripheral position on said external member, said hook portion being adapted for hooking a removal jig, the removal jig being adapted for removing said sensor assembly from said outer ring member.

9. A seal apparatus, said seal apparatus being adapted for detachably connecting to a wire harness-side connector, said seal apparatus comprising:
an outer ring member;
an outer ring side seal ring, said outer seal ring being fixed to said outer ring member, said outer seal ring and further comprising a nonmagnetic material;
an inner ring member;
an inner ring side seal ring, said inner seal ring being fixed to said inner ring member;
a magnetic sensor provided on an outer diameter of said outer seal ring;
a magnetic material ring, said magnetic material ring and said magnetic sensor forming a rotation detector, said rotation detector being integrally provided in said inner seal ring, said magnetic material ring radially opposing said magnetic sensor;
an external member, said external member molding said magnetic sensor with resin for integrating said magnetic sensor and said outer seal ring; and
a sensor side connector, said connector having one end, said one end being formed consecutive with said external member, said connector having another end, said other end detachably connecting to the wire harness side connector, wherein a hook portion is provided at a predetermined peripheral position on said external member, said hook portion being adapted for hooking a removal jig, the removal jib being adapted for removing said outer ring side seal ring from said outer ring member.

10. A rolling bearing apparatus, for vehicles, said apparatus being adapted for detachably connecting to a wire harness side connector, said apparatus comprising:

an outer ring member, said outer member being fixed to the vehicle body;

an inner ring member, said inner member being concentrically disposed with said outer ring member;

a plurality of rolling members, said rolling members being rotatably disposed between said outer ring member and said inner ring member;

an outer ring side seal ring, said outer seal ring being fixed to said outer ring member;

an inner ring side seal ring, said inner seal ring and said outer seal ring forming a seal apparatus, said seal apparatus being fixed to said inner ring member;

a magnetic sensor, said magnetic sensor being integrally provided in said outer seal ring;

an external member, said external member molding said magnetic sensor with resin for integrating said magnetic sensor and said outer seal ring;

a sensor side connector, said connector having one end, said one end being formed consecutive with said external member, said connector having another end, the other end detachably connecting to the wire harness side connector; and a pulser ring, said pulser ring and said magnetic sensor forming a rotation detector, said rotation detector being fixed on said inner seal ring, wherein a hook portion is provided at a predetermined peripheral position on said external member, said hook portion being adapted for hooking a removal jig, the removal jib being adapted for removing said outer ring side seal ring from said outer ring member.

11. A rolling bearing installation in a vehicle, comprising:
a rolling bearing apparatus including:
an outer ring member fixed to the vehicle;
an inner ring member disposed coaxially with said outer ring member;
a plurality of rolling bodies disposed so as to freely roll in a space between said outer ring member and said inner ring member;
a first seal ring fixed to an outer ring axial end of said outer ring member;
a second seal ring fixed to an inner ring axial end of the inner ring member;
said first seal ring and said second seal ring forming a seal unit;
a magnetic sensor provided integrally with said first seal ring;
a molded body formed by resin molding said magnetic sensor to integrate said magnetic sensor and said first seal ring into a ring shaped assembly, said molded body including a radially extending member radially extending from the ring shaped assembly and carrying conductors from said magnetic sensor; and
a pulsar ring fixed to said second seal ring, said pulsar ring and said magnetic sensor constituting a rolling detector; and
a vehicle mounted member connected to said vehicle proximate a position at which said rolling bearing apparatus is mounted, said vehicle mounted member detining a cutout and having said radially extending member disposed therethrough when said outer ring member is mounted to said vehicle.

12. A rolling bearing installation in a vehicle, comprising:
a rolling bearing assembly including:
an outer ring member fixed to the vehicle;
an inner ring member disposed coaxially with said outer ring member;
a plurality of rolling bodies disposed so as to freely roll in a space between said outer ring member and said inner ring member;
a first seal ring fixed to an outer ring axial end of said outer ring member;
a second seal ring fixed to an inner ring axial end of the inner ring member;
said first seal ring and said second seal ring forming a seal unit;
a magnetic sensor provided integrally with said first seal ring;
a molded body formed by resin molding said magnetic sensor to integrate said magnetic sensor arid said first seal ring;
a connector body having a first end connected to said molded body, and second end freely detachable to and from a connector on a wire harness of the vehicle; and
a pulsar ring fixed to said second seal ring, said pulsar ring and said magnetic sensor constituting a rolling detector; and
a vehicle mounted member connected to said vehicle proximate a position at which said rolling bearing apparatus is mounted, said vehicle mounted member defining a cutout and having said connector body disposed therethrough when said outer ring member is mounted to said vehicle.

* * * * *